(12) United States Patent  (10) Patent No.: US 9,076,248 B2
Tasaki et al.  (45) Date of Patent: Jul. 7, 2015

(54) DISPLAY APPARATUS

(71) Applicants: Tsuyoshi Tasaki, Kanagawa-ken (JP);
Aira Hotta, Kanagawa-ken (JP);
Akihisa Moriya, Kanagawa-ken (JP);
Takashi Sasaki, Kanagawa-ken (JP);
Haruhiko Okumura, Kanagawa-ken (JP)

(72) Inventors: Tsuyoshi Tasaki, Kanagawa-ken (JP);
Aira Hotta, Kanagawa-ken (JP);
Akihisa Moriya, Kanagawa-ken (JP);
Takashi Sasaki, Kanagawa-ken (JP);
Haruhiko Okumura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 175 days.

(21) Appl. No.: 13/714,967

(22) Filed: Dec. 14, 2012

(65) Prior Publication Data
US 2013/0181982 A1    Jul. 18, 2013

(30) Foreign Application Priority Data

Dec. 14, 2011   (JP) ................................ 2011-273007

(51) Int. Cl.
*G06T 15/00* (2011.01)
*B60K 35/00* (2006.01)
*G02B 27/01* (2006.01)

(52) U.S. Cl.
CPC ................ *G06T 15/00* (2013.01); *G02B 27/01* (2013.01); *G02B 2027/014* (2013.01); *B60K 35/00* (2013.01)

(58) Field of Classification Search
CPC .. B60K 35/00; G06T 15/00; G02B 2027/014; G02B 27/01

USPC .......................................... 345/419, 629, 631
See application file for complete search history.

(56) References Cited

U.S. PATENT DOCUMENTS

| 8,180,567 B2 * | 5/2012 | Geelen et al. ................. 701/431 |
| 8,423,292 B2 * | 4/2013 | Geelen et al. ................. 701/428 |
| 8,447,474 B2 * | 5/2013 | Breed ............................. 701/46 |

(Continued)

FOREIGN PATENT DOCUMENTS

| EP | 2 412 557 | 2/2012 |
| JP | 2006-284458 | 10/2006 |
| JP | 2010-066042 | 3/2010 |

(Continued)

OTHER PUBLICATIONS

Office Action mailed Jan. 5, 2015 in counterpart Japanese Patent Application Na 2011-273007 and English-language translation thereof.

*Primary Examiner* — Phu K Nguyen
(74) *Attorney, Agent, or Firm* — Nixon & Vanderhye, P.C.

(57) ABSTRACT

According to one embodiment, a display apparatus includes an image projection unit, an information acquisition unit and a data supply unit. The image projection unit projects a light flux including an image toward a projection layer which is reflective and transmissive. The information acquisition unit acquires information relating to a position of a three-dimensional object superimposing portion of three-dimensional objects positioned at a road. The road extends from a proximal region of the external environment proximal to the projection layer toward a distal region of the external environment distal to the projection layer. The three-dimensional object superimposing portion is higher than a ground surface and viewable via the projection layer. The data supply unit supplies data relating to the image including a display object to the image projection unit based on the information. The display object is displayed along the three-dimensional object superimposing portion.

20 Claims, 9 Drawing Sheets

(56) References Cited

U.S. PATENT DOCUMENTS 8,521,411 B2 * 8/2013 Grabowski et al. ........... 701/532
8,768,568 B2 * 7/2014 Uhlmann et al. ............... 701/36

FOREIGN PATENT DOCUMENTS

| JP | 2010-76533 | 4/2010 |
|----|------------|--------|
| JP | 2010-221830 | 10/2010 |

* cited by examiner

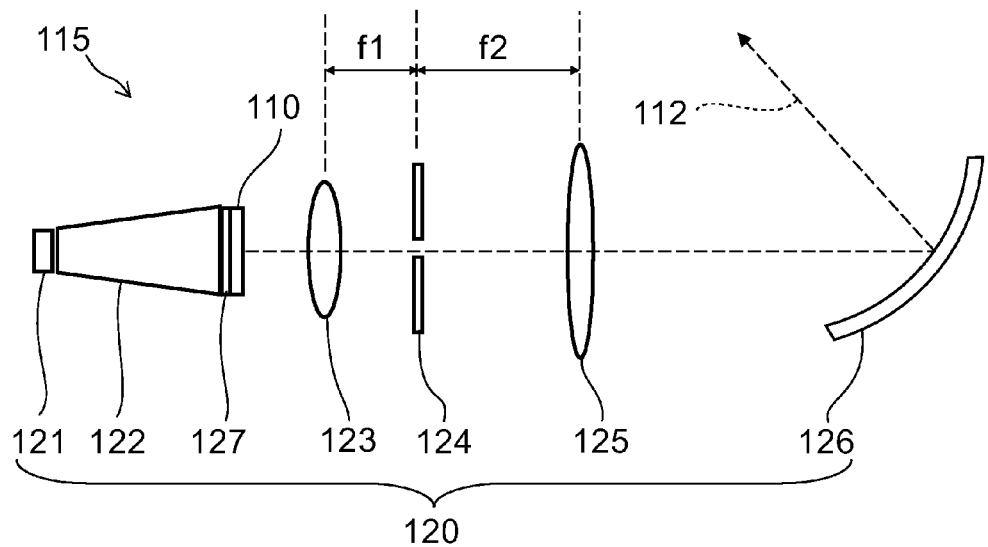
FIG. 3
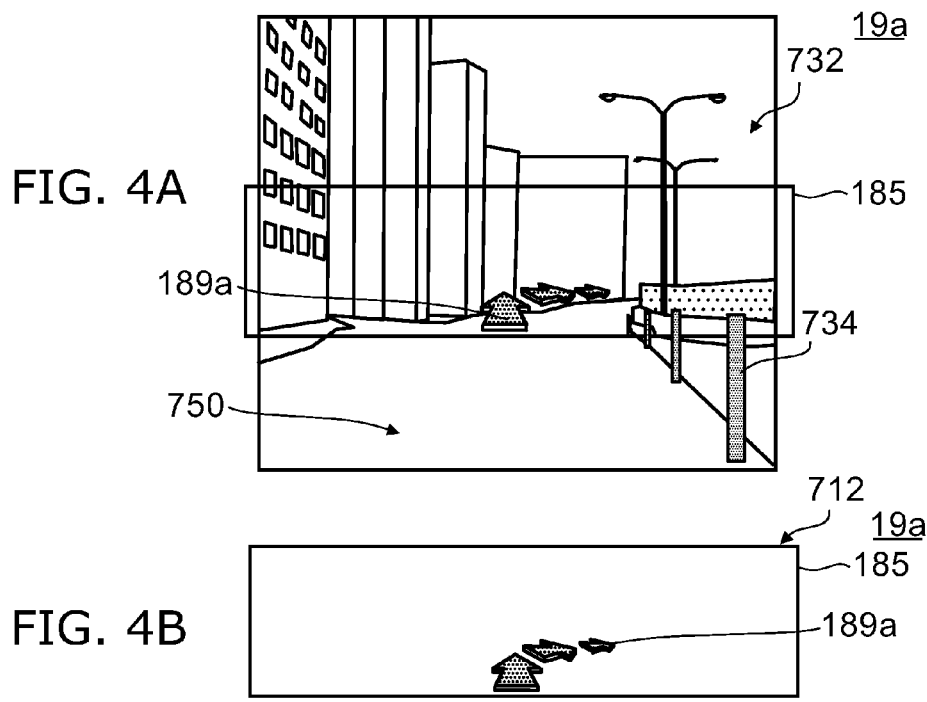
FIG. 4A
FIG. 4B

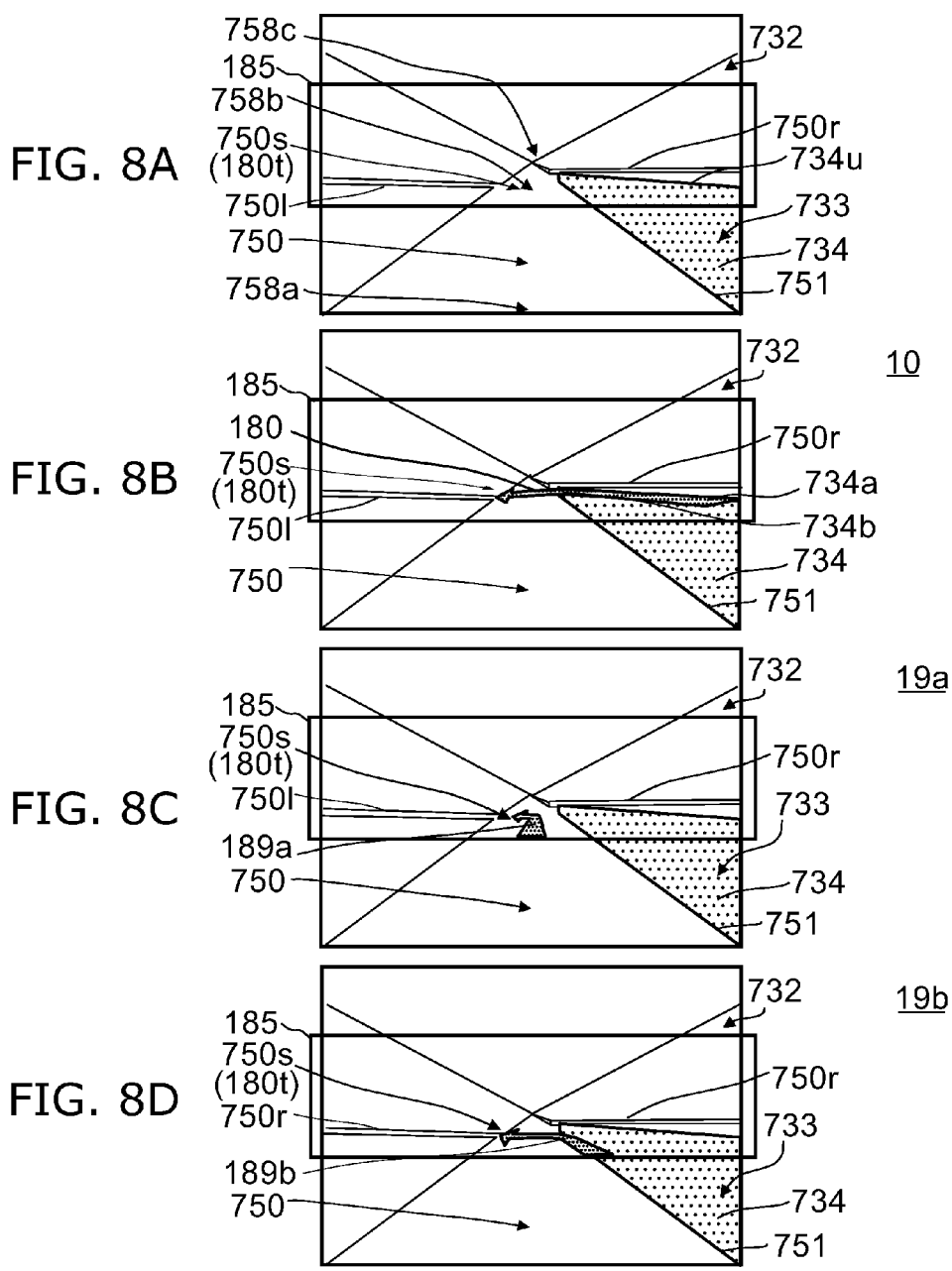

DISPLAY APPARATUS

CROSS-REFERENCE TO RELATED APPLICATIONS

This application is based upon and claims the benefit of priority from the prior Japanese Patent Application No. 2011-273007, filed on Dec. 14, 2011; the entire contents of which are incorporated herein by reference.

FIELD

Embodiments described herein relate generally to a display apparatus.

BACKGROUND

For example, there is a display apparatus that displays a shape such as an arrow indicating a change of the travel direction and the like superimposed onto a target position of an actual background image in applications such as navigation, etc. It is desirable to perceive the depthward position of the arrow that is displayed at the target depthward position of the background image with high precision.

BRIEF DESCRIPTION OF THE DRAWINGS

FIG. 3 is a schematic view illustrating the configuration of a portion of the display apparatus according to the first embodiment;

FIG. 4A and FIG. 4B are schematic views illustrating the operation of a display apparatus of a first reference example;

FIG. 8A to FIG. 8D are schematic views illustrating the operations of the display apparatuses;

DETAILED DESCRIPTION

Figure 1A:
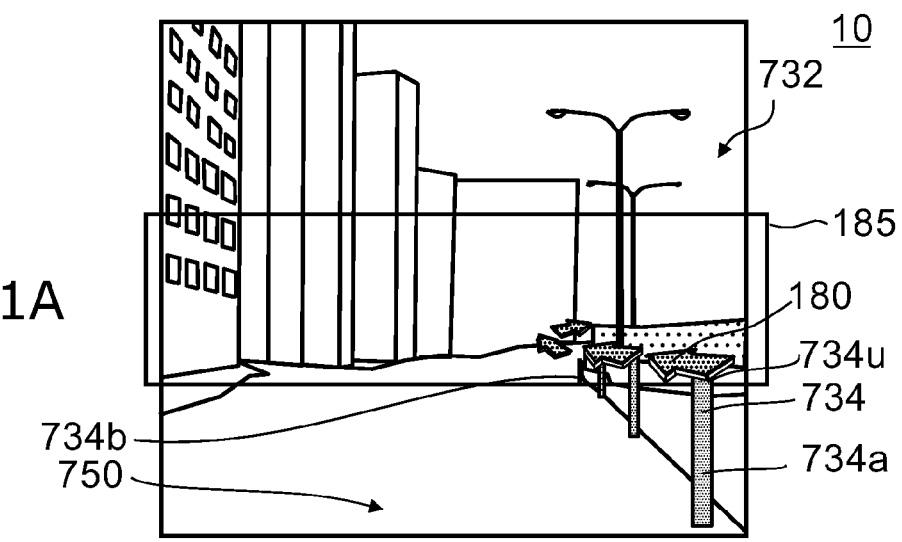
FIG. 1 A to FIG. 1C are schematic views illustrating the operation of the display apparatus according to the first embodiment.

According to one embodiment, a display apparatus includes an image projection unit, an information acquisition unit and a data supply unit. The image projection unit is configured to project a light flux including an image toward a projection layer. The projection layer is reflective and transmissive. The information acquisition unit is configured to acquire information relating to a position of a three-dimensional object superimposing portion of three-dimensional objects positioned at a road laterally on an opposite side of the projection layer where the light flux is incident. The road extends from a proximal region of the opposite side toward a distal region of the opposite side. The three-dimensional object superimposing portion is higher than a ground surface and viewable via the projection layer. The data supply unit is configured to supply data relating to the image including a display object to the image projection unit based on the information relating to the position of the three-dimensional object superimposing portion acquired by the information acquisition unit. The display object is displayed along the three-dimensional object superimposing portion when viewed via the projection layer.

Various embodiments will be described hereinafter with reference to the accompanying drawings.

The drawings are schematic or conceptual; and the relationships between the thicknesses and the widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

First Embodiment

For example, a display apparatus according to the embodiment is mounted in a moving body such as a vehicle, etc. The display apparatus according to the embodiment may not be mounted in the moving body and may be wearable by the user. Hereinbelow, an example of the case where the display apparatus is mounted in the moving body will be described.

Figure 1B:
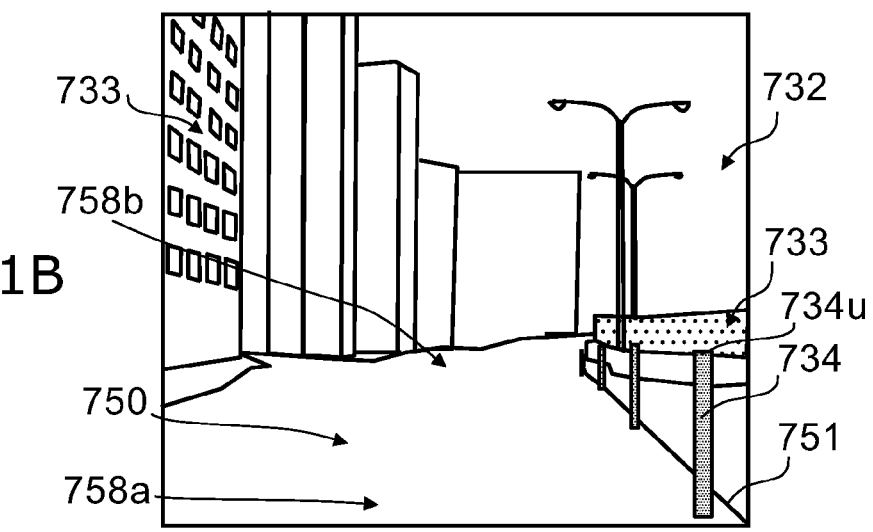
Figure 1C:

FIG. 1A to FIG. 1C are schematic views illustrating the operation of the display apparatus according to the first embodiment.

Figure 2:
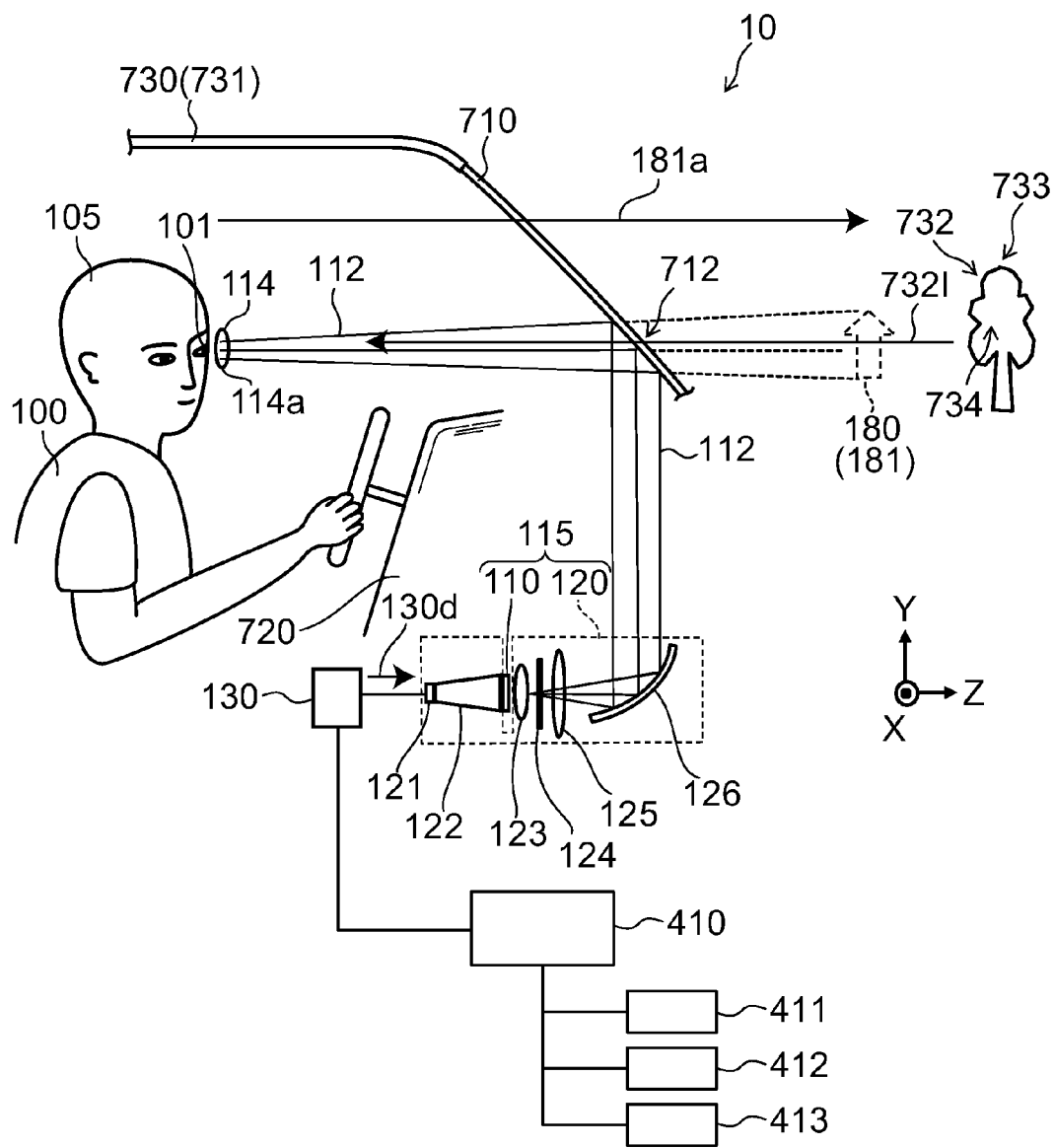
FIG. 2 is a schematic view illustrating the configuration of the display apparatus according to the first embodiment.

FIG. 2 is a schematic view illustrating the configuration of the display apparatus according to the first embodiment.

FIG. 3 is a schematic view illustrating the configuration of a portion of the display apparatus according to the first embodiment.

As shown in FIG. 2, the display apparatus 10 includes an image projection unit 115, an information acquisition unit 410, and a data supply unit 130.

The image projection unit 115 projects light flux 112 including an image toward a projection layer 712. The projection layer 712 is reflective and transmissive. The display apparatus 10 may further include the projection layer 712.

In this example, the display apparatus 10 is mounted in a moving body 731, etc., such as a vehicle 730, etc. In such a case, the projection layer 712 is provided proximally to a windshield unit 710 of the vehicle 730. For example, a layer that is reflective and transmissive may be formed at the surface of the windshield unit 710 on the interior side; and this layer may be used as the projection layer 712. A plate (layer) or the like that is reflective and transmissive may be provided proximally to the windshield unit 710 on the interior side of the windshield unit 710; and this plate (layer) may be used as the projection layer 712.

The user (a human viewer 100) of the display apparatus 10 is positioned on the side of the projection layer 712 where the light flux 112 is incident. The light flux 112 emitted from the image projection unit 115 is incident on the projection layer 712. The light flux 112 is reflected by the projection layer 712; and the light flux 112 that is reflected is projected toward the head 105 of the human viewer 100. The light flux 112 is incident on an eye 101 of the human viewer 100.

An external environment 732 is on the side of the projection layer 712 that is opposite to the side where the light flux 112 is incident. In other words, the projection layer 712 is disposed between the human viewer 100 and the external environment 732.

Light 732*l* from the external environment 732 that passes through the projection layer 712 can be incident on the eye 101 of the human viewer 100. The human viewer 100 can view the image of the external environment 732 via the projection layer 712. The human viewer 100 views the image included in the light flux 112 that is reflected by the projection layer 712 as being superimposed onto the external environment 732 via the projection layer 712.

The projection layer 712 has a constant size. A portion of the external environment 732 that is viewable by the human viewer 100 via the projection layer 712 is positioned within a prescribed range.

The information acquisition unit 410 acquires information relating to the position of a three-dimensional object superimposing portion 734 of a three-dimensional object 733 existing in the external environment 732 that is higher than the ground surface and viewable via the projection layer 712. Examples of the three-dimensional object 733 and the three-dimensional object superimposing portion 734 are described below.

For example, a position acquisition unit 411 that acquires information relating to the current position of the display apparatus 10 is provided inside the display apparatus 10. Or, the position acquisition unit 411 is connected to the display apparatus 10. For example, the position acquisition unit 411 acquires information relating to the position of the display apparatus 10 (or the position of the vehicle 730) by a GPS (Global Positioning System), etc. Information relating to the three-dimensional object 733 and the three-dimensional object superimposing portion 734 is obtained based on, for example, map information and the position acquired by the position acquisition unit 411.

For example, an imaging unit 412 that images the image of the external environment 732 is provided inside the display apparatus 10. Or, the imaging unit 412 is connected to the display apparatus 10. Information relating to the three-dimensional object 733 and the three-dimensional object superimposing portion 734 is obtained based on the image of the external environment 732 that is imaged by the imaging unit 412.

For example, a distance sensor 413 is provided inside the display apparatus 10. Or, the distance sensor 413 is connected to the display apparatus 10. The information relating to the three-dimensional object 733 and the three-dimensional object superimposing portion 734 is obtained based on the information detected by the distance sensor 413.

For example, the display apparatus 10 further includes at least one selected from the position acquisition unit 411, the imaging unit 412, and the distance sensor 413.

The data supply unit 130 supplies data (image data 130*d*) relating to the image including a display object 180 to the image projection unit 115. The display object 180 is displayed along the three-dimensional object superimposing portion 734 when viewed via the projection layer 712 based on the information relating to the position of the three-dimensional object superimposing portion 734 acquired by the information acquisition unit 410. In other words, for example, the data supply unit 130 generates an image signal (the image data 130*d*) corresponding to the image including the display object 180 and supplies the image data 130*d* that is generated to an image formation unit 110. Or, the image data 130*d* corresponding to the image including the display object 180 is generated by a data generation unit provided separately from the display apparatus 10; and the data supply unit 130 acquires the image data 130*d* that is generated and supplies the image data 130*d* (after performing prescribed processing if necessary) to the image formation unit 110.

The image projection unit 115 to which the image data 130*d* is supplied displays the image based on the image data 130*d*. In other words, the image projection unit 115 displays the display object 180 included in the image.

The display object 180 is provided in the image that the display apparatus 10 presents to the human viewer 100. For example, the display object 180 is various display content relating to the operation information of the vehicle 730 (the moving body 731) such as an arrow that indicates the travel direction, etc.

As illustrated in FIG. 2, for example, the display apparatus 10 is provided inside the vehicle 730. For example, the display apparatus 10 is disposed in the inner portion of a dashboard 720 of the vehicle 730 as viewed by the human viewer 100, i.e., the operator.

Herein, the direction from the human viewer 100 toward the front is taken as a Z-axis direction. The Z-axis direction is the direction from the rear of the vehicle 730 toward the front. The left and right direction as viewed by the human viewer 100 is taken as an X-axis direction. The vertical direction as viewed by the human viewer 100 is taken as a Y-axis direction.

For example, the image projection unit 115 includes the image formation unit 110 and a projection unit 120.

The image formation unit 110 may include, for example, various optical switches such as a liquid crystal display apparatus (LCD), a DMD (Digital Micromirror Device), a MEMS (Micro-electro-mechanical System), etc. The image formation unit 110 forms the image in the screen of the image formation unit 110 based on the image signal (the image data 130*d*) supplied from the data supply unit 130.

The projection unit 120 may include, for example, various light sources, lenses, mirrors, various optical elements that control the projection region, etc.

In the specific example, the projection unit 120 includes a first lens 123, a second lens 125, and an aperture 124 (a projection region control unit) provided between the first lens 123 and the second lens 125. For example, the size of the opening of the aperture 124 may be variable.

For example, as shown in FIG. 3, the projection unit 120 includes a light source 121, a tapered light guide 122, the first lens 123, the second lens 125, the aperture 124, and a mirror 126. The first lens 123 is disposed between the light source 121 and the mirror 126; the second lens 125 is disposed between the first lens 123 and the mirror 126; and the tapered light guide 122 is disposed between the light source 121 and the first lens 123. In the specific example, the image formation unit 110 (e.g., an LCD) is disposed between the tapered light guide 122 and the first lens 123.

For example, the aperture 124 is mounted at a position that is a distance f1 from the first lens 123 and a distance f2 from the second lens 125, where the focal distance of the first lens 123 is the distance f1 and the focal distance of the second lens 125 is the distance f2. For example, the mirror 126 has a concave configuration. Thereby, the image of the light flux 112 can be enlarged and projected toward the human viewer 100.

The light source 121 may include various light sources such as an LED (Light Emitting Diode), a high pressure mercury lamp, a halogen lamp, a laser, etc. By using an LED as the light source 121, the power consumption can be reduced; and the apparatus can be lighter and smaller.

The light emitted from the light source 121 is controlled by the tapered light guide 122 to have a divergence angle within some range. After passing through the image formation unit 110, this light becomes the light flux 112 that includes the image including the prescribed display object 180. The size of the cross section of the light flux 112 (the cross section when the light flux 112 is cut by a plane perpendicular to the optical axis of the light flux 112) is controlled to be a prescribed size by passing through the first lens 123, the aperture 124, and the second lens 125.

In the specific example, a diffuser plate 127 is provided between the tapered light guide 122 and the image formation unit 110. Thereby, the light that is incident on the image formation unit 110 is more uniform.

As shown in FIG. 2, after the light flux 112 is reflected by the mirror 126, the light flux 112 is reflected by the projection layer 712 to reach the eye 101 (e.g., one eye) of the human viewer 100.

For example, a projection area 114 and a projection position 114a of the projection region of the light flux 112 are controlled by various optical elements included in the image projection unit 115. Thereby, for example, the light flux 112 is caused to be incident on the one eye 101 of the human viewer 100; and the light flux 112 is caused to be not incident on the other eye. For example, the width of the projection area 114 of the light flux 112 in the lateral direction (the lateral direction when viewed by the human viewer 100) is controlled to be not more than 70 mm (millimeters) at a position of the human viewer 100. Or, the width of the projection area 114 in the lateral direction is controlled to be not more than 65 mm. Or, the width of the projection area 114 in the lateral direction is controlled to be not more than 60 mm.

The mirror 126 may be movable; and the light flux 112 may be projected appropriately toward the one eye 101 by adjusting the position and/or the angle of the mirror 126 manually or automatically to match, for example, the position and/or the movement of the head 105 of the human viewer 100.

In the embodiment, the light flux 112 may be projected toward both eyes of the human viewer 100.

Other than the examples recited above, various modifications of the image projection unit 115 are possible.

The human viewer 100 perceives an image 181 of the display object 180 formed at a virtual image formation position 181a via the projection layer 712. The human viewer 100 can simultaneously view the image of the external environment 732 of the vehicle 730 and the image 181 of the display object 180 (e.g., the arrow) of the image included in the light flux 112 that is projected. Thus, the display apparatus 10 can be used as a HUD (Head Up Display). In the display apparatus 10, the display object 180 is viewed superimposed onto the background image of the external environment 732. The display object 180 indicates the target position of the external environment 732.

For example, the display apparatus 10 is mounted in the moving body 731. The moving body 731 includes the windshield unit (e.g., the windshield unit 710) provided between the external environment 732 and the human viewer 100 that views the display object 180. The projection layer 712 is provided proximally to the windshield unit. The image projection unit 115 causes the light flux 112 to be incident on the one eye (the eye 101) of the human viewer 100 and causes the light flux 112 to be not incident on both eyes. Thus, the display apparatus can be used as a monocular apparatus for a moving body (for a vehicle). By viewing the display object 180 with the one eye, the effect of binocular parallax is eliminated; and the viewing is easy. By providing the projection layer 712 proximally to the windshield unit, it becomes easier to control the perceived position of the display object 180 in the depth direction by the distance between the eye 101 and the projection layer 712 being not less than about 50 cm and by using a monocular configuration in this state.

FIG. 1B illustrates the image of the external environment 732 of the display apparatus 10. For example, FIG. 1B illustrates the image of the external environment 732 of the display apparatus 10 that is viewed via the projection layer 712. FIG. 1C illustrates the display object 180 that is displayed by the display apparatus 10. FIG. 1A illustrates the state in which the display object 180 is superimposed onto the external environment 732. FIG. 1A corresponds to the state in which the human viewer 100 views the display object 180 and the external environment 732.

As shown in FIG. 1B, a road 750 exists in the external environment 732. The road 750 extends from a proximal region 758a toward a distal region 758b. The proximal region 758a is proximal to the display apparatus 10. The distal region 758b is more distal than the proximal region 758a as viewed from the display apparatus 10. The proximal region 758a is proximal to the projection layer 712. The distal region 758b is more distal to the projection layer 712 than is the proximal region 758a.

The three-dimensional object 733 that is positioned at the side of the road 750 exists in the external environment 732. For example, the three-dimensional object 733 is a building, a street light, a guardrail, a pole, a column, etc., provided at the side of the road 750. The three-dimensional object 733 also may include a movable object such as a vehicle, etc., existing at the side of the road 750. The three-dimensional object 733 has a portion that is higher than a ground surface 751. The side of the road 750 also includes the boundary portion of the road 750 (the portion proximal to the edge of the road 750).

In the display apparatus 10 as shown in FIG. 1C, the light flux 112 is projected toward the projection layer 712; and the display object 180 (in this example, multiple arrows) is displayed. The region where the external environment 732 can be viewed via the projection layer 712 is taken as a superimposed region 185.

As shown in FIG. 1A, the three-dimensional object superimposing portion 734 of the three-dimensional object 733 of the external environment 732 that is positioned inside the superimposed region 185 exists when the human viewer 100 views the display object 180 and the external environment 732. In this example, a pole (a portion of the three-dimensional object 733) provided at the side of the road 750 is used as the three-dimensional object superimposing portion 734. The three-dimensional object superimposing portion 734 of the three-dimensional object 733 is positioned higher than the ground surface 751 and is viewable via the projection layer 712. The distance between the three-dimensional object superimposing portion 734 and the ground surface 751 is, for example, not less than 0.3 m and not more than 10 m. The distance is, for example, not less than 0.5 m and not more than 5 m.

The display object 180 is displayed along the three-dimensional object superimposing portion 734 that is higher than the ground surface 751 and is viewable via the projection layer 712. In this example, the display object 180 is displayed along an apical portion 734u of the three-dimensional object superimposing portion 734 (the pole). In other words, the image data 130d relating to the image including the display object 180 is supplied from the data supply unit 130 to the image projection unit 115. The display object 180 is included in the image of the image data 130d. The display object 180 is displayed along the three-dimensional object superimposing portion 734 when viewed via the projection layer 712. Such a display object 180 is displayed by displaying the image based on the image data 130d.

Thereby, a display apparatus that can cause the depthward position of the display object 180 to be perceived with good precision can be provided.

FIG. 4A and FIG. 4B are schematic views illustrating the operation of a display apparatus of a first reference example.

FIG. 4B illustrates a display object 189a displayed by the display apparatus 19a of the first reference example. FIG. 4A illustrates the state in which the display object 189a that is displayed by the display apparatus 19a is viewed superimposed onto the external environment 732. In this case, the external environment 732 is the same as the external environment 732 illustrated in FIG. 1B.

In the display apparatus 19a of the first reference example as shown in FIG. 4A and FIG. 4B, the display object 189a (in this example, the multiple arrows) is displayed along the road 750. For example, the display object 189a is displayed along the road 750 on the surface of the road 750 (on the ground surface 751).

In the operation of the first reference example in which the display object 189a is displayed along the road 750 as shown in FIG. 4A, the position of the front side of the external environment 732 where it is possible to be superimposed onto the superimposed region 185 is distal as viewed by the human viewer 100 (i.e., as viewed from the display apparatus 19a). Therefore, the range of the external environment 732 in the depth direction where the display object 189a can be superimposed is narrow. Accordingly, there are cases where the position of the external environment 732 indicated by the display object 189a is difficult to perceive. In the case where the display object 189a is displayed along the road 750 above the road 750 (e.g., 0.5 m in the air above the ground surface 751) as well, the position of the front side of the external environment 732 where it is possible to be superimposed onto the superimposed region 185 is similarly distal; and the range of the external environment in the depth direction where the display object 189a can be superimposed is narrow.

Conversely, in the embodiment as illustrated in FIG. 1A, the display object 180 is displayed along the three-dimensional object 733 (the three-dimensional object superimposing portion 734) at the side of the road 750. Thereby, the position of the front side of the external environment 732 where it is possible to be superimposed onto the superimposed region 185 is proximal as viewed by the human viewer 100 (i.e., as viewed from the display apparatus 10). Therefore, the range of the external environment in the depth direction where the display object 180 can be superimposed is wide. As a result, in the embodiment, the position of the external environment 732 indicated by the display object 180 is easy to perceive.

FIG. 5A to FIG. 5D are schematic views illustrating the operations of display apparatuses.

Figure 5A:
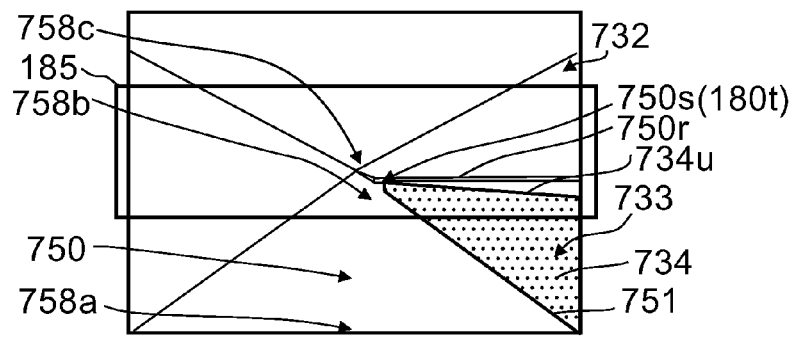
FIG. 5A to FIG. 5D are schematic views illustrating the operations of display apparatuses.
Figure 5B:
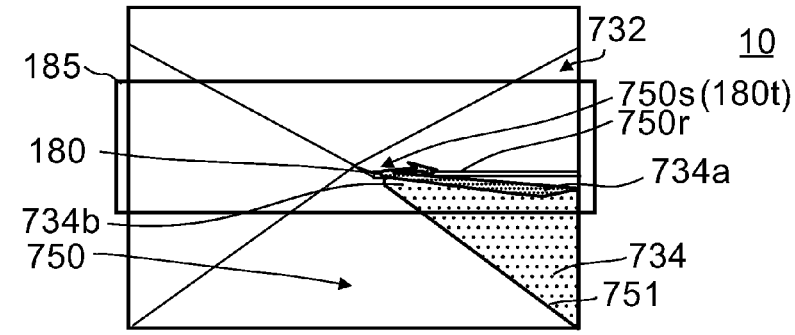
Figure 5C:
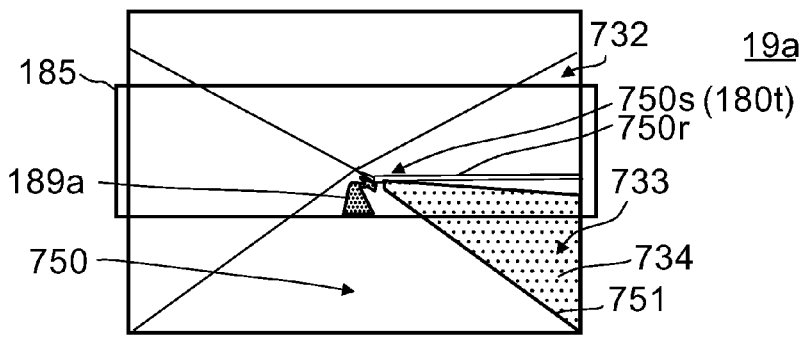
Figure 5D:
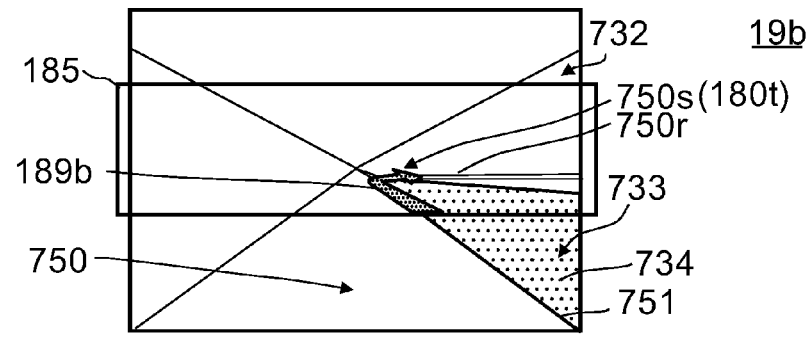

FIG. 5A illustrates the image of the external environment 732. FIG. 5B illustrates the state in which the display object 180 that is displayed by the display apparatus 10 according to the embodiment is viewed superimposed onto the external environment 732. FIG. 5C illustrates the state in which the display object 189a that is displayed by the display apparatus 19a of the first reference example is viewed superimposed onto the external environment 732. FIG. 5D illustrates the state in which a display object 189b that is displayed by a display apparatus 19b of a second reference example is viewed superimposed onto the external environment 732. These drawings illustrate the operations of the display apparatuses using simplified models.

In the external environment 732 as shown in FIG. 5A, the road 750 extends from the proximal region 758a toward the distal region 758b. For example, the boundaries on both sides of the road 750 intersect at a vanishing point 758c. In this example, a right road 750r that extends to the right side is connected at the right side of the road 750. In this example, the display object instructs to make a right turn at a spot (an intersection 750s) where the road 750 intersects the right road 750r. In the external environment 732, the three-dimensional object 733 having a portion higher than the ground surface 751 at the side (in this example, the side on the right side) of the road 750 exists. For example, the three-dimensional object 733 is the wall of a building provided along the right side of the road 750, etc.

In this example, the display object is displayed continuously inside the superimposed region 185 along the route from the edge on the proximal region 758a side to the position of the intersection 750s. The position of the intersection 750s corresponds to a target position 180t of the external environment 732 indicated by the display object.

In the display apparatus 10 according to the embodiment as shown in FIG. 5B, the display object 180 is displayed along the three-dimensional object superimposing portion 734 of the three-dimensional object 733. The three-dimensional object superimposing portion 734 exists inside the superimposed region 185 and is higher than the ground surface 751. In this example, the three-dimensional object superimposing portion 734 is the upper portion of the wall (corresponding to the apical portion 734u). In other words, the display object 180 extends along the upper portion of the wall from the proximal region 758a toward the intersection 750s.

In the display apparatus 19a of the first reference example as shown in FIG. 5C, the display object 189a is displayed along the road 750. The length of the display object 189a is short. In the display object 189a displayed along the road 750, the distance inside the superimposed region 185 from the edge on the proximal region 758a side to the position of the intersection 750s is short.

In the display apparatus 19b of the second reference example as shown in FIG. 5D, the display object 189b is displayed along the boundary of the road 750. The boundary of the road 750 is the portion of the boundary between the road 750 and the three-dimensional object 733 and corresponds to the portion of the three-dimensional object 733 at the height of the ground surface 751. In other words, in the display apparatus 19b of the second reference example, the display object 189b is displayed along the portion of the three-dimensional object 733 viewable via the projection layer 712 that is at the position of the ground surface 751. The length of the display object 189b is longer than the length of the display object 189a but is relatively short.

Conversely, as shown in FIG. 5B, the length of the display object 180 of the embodiment is longer than the length of the display object 189a and the length of the display object 189b. In the embodiment, the range of the external environment in the depth direction where the display object 180 can be superimposed is wider than those of the first and second reference examples. Thereby, in the embodiment, the display object 180 is easily recognized; and the position (the target position 180t) of the external environment 732 indicated by the display object 180 is easy to perceive.

Thus, according to the embodiment, a display apparatus that can cause the depthward position of the display object 180 to be perceived with good precision can be provided.

In the display apparatus 10, the height of the display object 180 is perceived based on the height of the three-dimensional object 733 of the external environment. Thereby, the perception shift in the depth direction due to the perception shift of the height can be reduced. The position of the target position 180t indicated by the display object 180 can be intuitively and accurately perceived. In the embodiment, the height positional shift of the display object 180 can be reduced; and the depthward position can be perceived more accurately.

In the display apparatus 10 according to the embodiment as shown in FIG. 5B, the display object 180 indicates the position of the target (the target position 180t) that is more distal inside the external environment 732 than is the proximal region 758a recited above. The target position 180t is, for example, the position of a spot where the travel direction is changed toward a direction that is different from the direction along the road 750. For example, the target position 180t is the position of the intersection 750s. The target position 180t may be the position of a building provided at the side of the road 750.

The display object 180 indicates the route from the proximal region 758a to the target position 180t recited above.

The state in which the display object 180 indicates the route includes the case where the display object 180 has a continuous configuration that has a portion that reaches the portion corresponding to the target position 180t from the portion corresponding to the proximal region 758a in the image. The state in which the display object 180 indicates the route includes the case where multiple display objects 180 are multiply provided, and at least a portion of the multiple display objects 180 is arranged along the route from the position corresponding to the proximal region 758a to the position corresponding to the target position 180t in the image. The state in which the display object 180 indicates the route includes the case where the multiple display objects 180 are provided, and the multiple display objects 180 are sequentially displayed along the route from the position corresponding to the proximal region 758a to the position corresponding to the target position 180t in the image. The state in which the display object 180 indicates the route includes the case where the display object 180 moves at least from the position corresponding to the proximal region 758a to the position corresponding to the target position 180t in the image. The state in which the display object 180 indicates the route includes the case where the configuration of the display object 180 changes from the state of having a portion corresponding to the proximal region 758a to the state of having a portion corresponding to the target position 180t in the image. The state in which the display object 180 indicates the route includes the state in which the display object 180 traces the route.

In the example shown in FIG. 5B, the axis of the display object 180 extends to correspond to the route from the proximal region 758a to the target position 180t recited above. In the example shown in FIG. 1A, multiple display objects 180 (arrow shapes) are used; and the multiple display objects 180 are arranged to correspond to the route from the proximal region 758a to the target position 180t recited above.

For example, as shown in FIG. 5B, the three-dimensional object superimposing portion 734 has a portion 734a proximal to the position of the proximal region 758a recited above and a portion 734b proximal to the target position 180t.

As shown in FIG. 5B, the display object 180 is continuous between the portion 734a of the three-dimensional object superimposing portion 734 proximal to the position of the proximal region 758a recited above and the portion 734b of the three-dimensional object superimposing portion 734 proximal to the target position 180t when viewed via the projection layer 712. In this example, the display object 180 is one shape.

In the embodiment, the display object 180 may be a plurality. For example, as illustrated in FIG. 1A and FIG. 1C, the display object 180 is multiply provided. As shown in FIG. 1A, the multiple display objects 180 are arranged along the three-dimensional object superimposing portion 734 between the portion 734a of the three-dimensional object superimposing portion 734 proximal to the position of the proximal region 758a recited above and the portion 734b of the three-dimensional object superimposing portion 734 proximal to the target position 180t when viewed via the projection layer 712. For example, one or multiple display objects 180 may move along the three-dimensional object superimposing portion 734 in the image between the portion 734a and the portion 734b when viewed via the projection layer 712.

The display object 180 may move along the three-dimensional object superimposing portion 734 in the image over time. The display object 180 may be displayed sequentially along the route over time.

As described above, for example, the information relating to the three-dimensional object 733 and the three-dimensional object superimposing portion 734 is obtained based on at least one selected from the map information and the current position obtained by the position acquisition unit 411, the image of the external environment 732 obtained by the imaging unit 412, and the distance of the three-dimensional object 733 obtained by the distance sensor 413. An example of the method for determining the three-dimensional object superimposing portion 734 will now be described.

FIG. 6A to FIG. 6D are schematic views illustrating the operation of the display apparatus according to the first embodiment.

These drawings illustrate circumstances when the road 750 is viewed from the sky above the display apparatus 10.

Figure 6A:
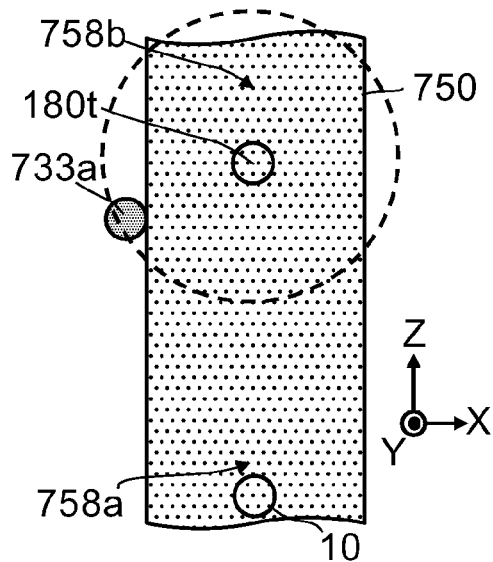
FIG. 6A to FIG. 6D are schematic views illustrating the operation of the display apparatus according to the first embodiment.

As shown in FIG. 6A, the information acquisition unit 410 selects a first proximal three-dimensional object 733a of the three-dimensional object 733 for which the distance to the target position 180t is shorter than a predetermined distance. For example, the first proximal three-dimensional object 733a is the proximal three-dimensional object of the three-dimensional object 733 that is most proximal to the target position 180t. The first proximal three-dimensional object 733a may be used as the three-dimensional object superimposing portion 734. In other words, the three-dimensional object superimposing portion 734 includes the first proximal three-dimensional object 733a. For example, in the case where the first proximal three-dimensional object 733a is a wall, etc., and the wall extends continuously from the target position 180t to the proximal region 758a recited above, the wall (the first proximal three-dimensional object 733a) is used as the three-dimensional object superimposing portion 734.

Figure 6B:
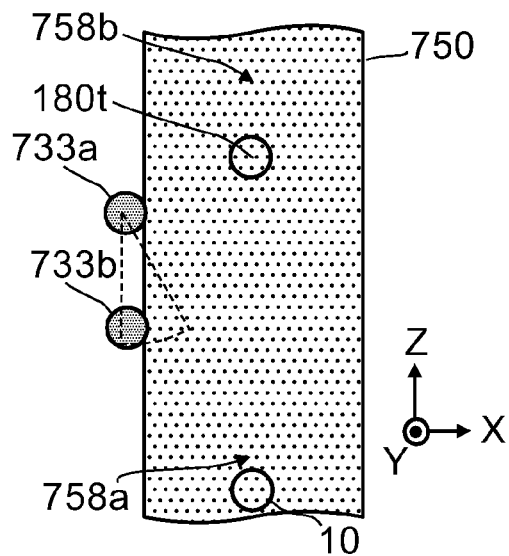

As shown in FIG. 6B, the information acquisition unit 410 selects a second proximal three-dimensional object 733b of the three-dimensional object 733 that exists between the first proximal three-dimensional object 733a and the proximal region 758a recited above. The second proximal three-dimensional object 733b may be used as the three-dimensional object superimposing portion 734. In other words, the three-dimensional object superimposing portion 734 further includes the second proximal three-dimensional object 733b.

Figure 6C:
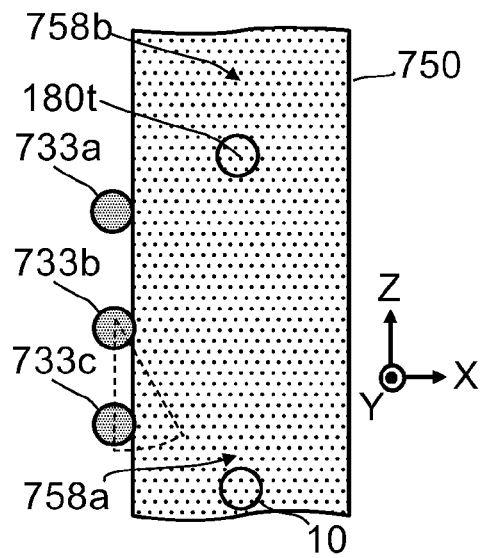

As shown in FIG. 6C, the information acquisition unit 410 selects a third proximal three-dimensional object 733c of the three-dimensional object 733 that exists between the second proximal three-dimensional object 733b and the proximal region 758a recited above. The third proximal three-dimensional object 733c may be used as the three-dimensional object superimposing portion 734. In other words, the three-dimensional object superimposing portion 734 further includes the third proximal three-dimensional object 733*c*. Thus, the information acquisition unit 410 may select any number of proximal three-dimensional objects; and the proximal three-dimensional objects that are selected may be used as the three-dimensional object superimposing portion 734. Thus, the information acquisition unit 410 acquires the information relating to the position of the three-dimensional object superimposing portion 734.

Figure 6D:
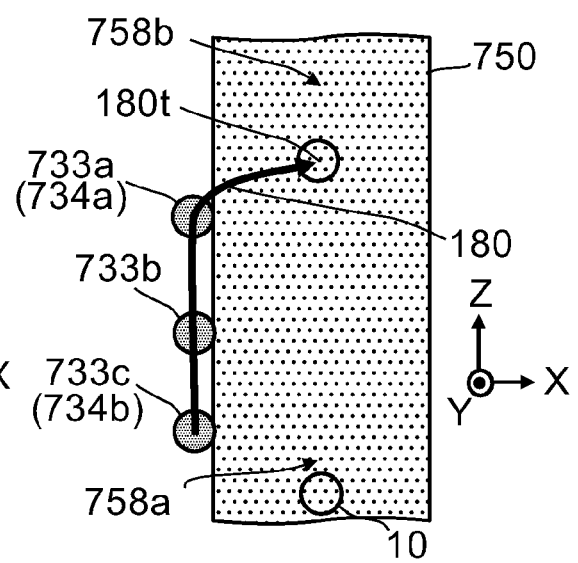

As shown in FIG. 6D, the display object 180 is displayed along the three-dimensional object superimposing portion 734 when viewed via the projection layer 712 based on the information recited above relating to the position of the three-dimensional object superimposing portion 734 acquired by the information acquisition unit 410. This operation is implemented by the data supply unit 130. The portion 734*a* of the three-dimensional object superimposing portion 734 proximal to the position of the proximal region 758*a* recited above is the third proximal three-dimensional object 733*c*; and the portion 734*b* of the three-dimensional object superimposing portion 734 proximal to the target position 180*t* is the first proximal three-dimensional object 733*a*.

In this example, the display object 180 is one continuous shape (arrow); and the display object 180 is continuous between the first proximal three-dimensional object 733*a* (the portion 734*a*) and the third proximal three-dimensional object 733*c* (the portion 734*b*). The display object 180 further extends to the position of the target position 180*t*.

For example, the display object 180 moves between the first proximal three-dimensional object 733*a* (the portion 734*a*) and the third proximal three-dimensional object 733*c* (the portion 734*b*). The display object 180 further moves to the position of the target position 180*t*.

In the case where the display object 180 is multiply provided, the multiple display objects 180 are arranged between the first proximal three-dimensional object 733*a* (the portion 734*a*) and the third proximal three-dimensional object 733*c* (the portion 734*b*) along a direction (an axis) from the first proximal three-dimensional object 733*a* toward the third proximal three-dimensional object 733*c*. For example, one selected from the multiple display objects 180 is displayed at the position of the target position 180*t*.

The selection of the proximal three-dimensional objects may be implemented repeatedly.

Figure 7:
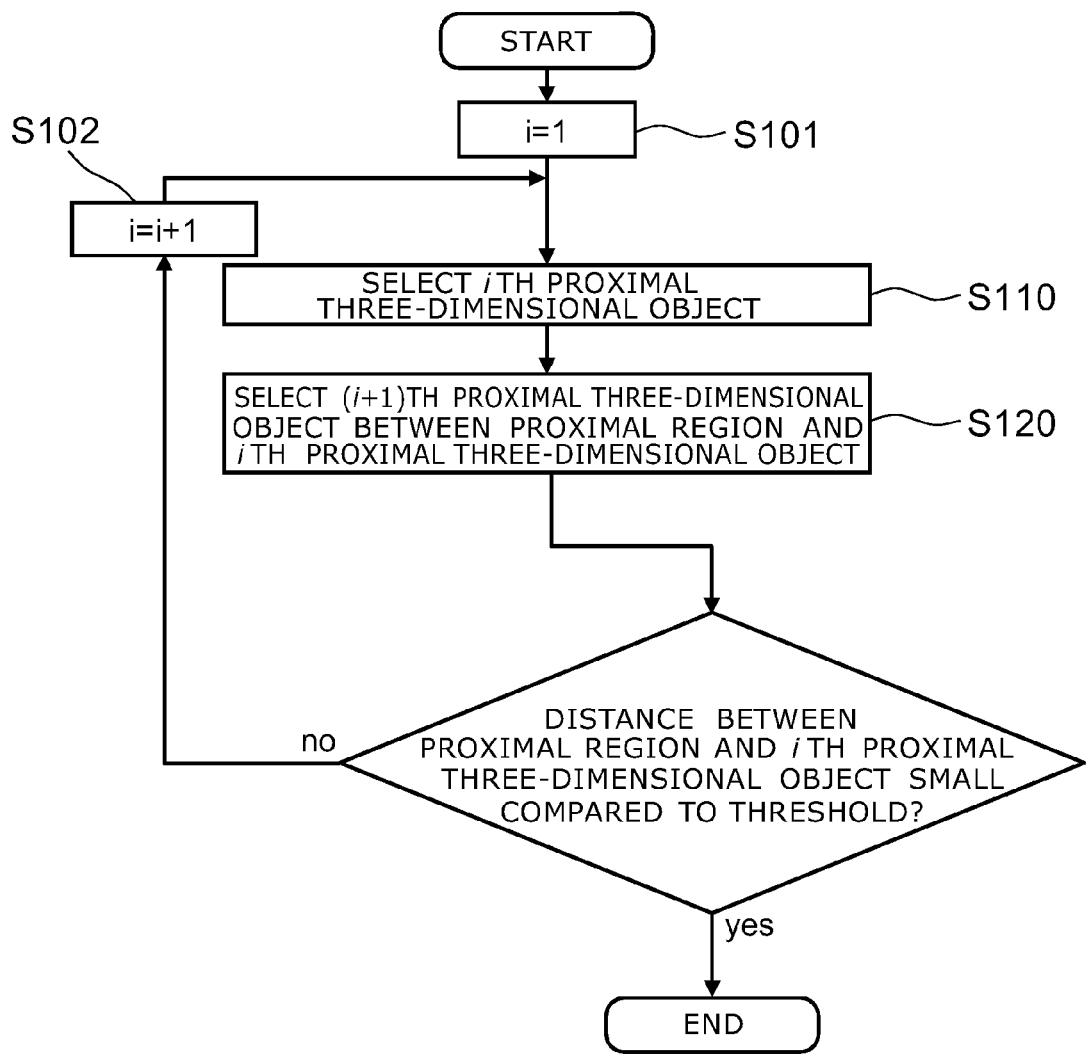
FIG. 7 is a flowchart illustrating the operation of the display apparatus according to the first embodiment.

FIG. 7 is a flowchart illustrating the operation of the display apparatus according to the first embodiment.

As shown in FIG. 7, an integer i is set to 1 (step S101).

The ith proximal three-dimensional object 733*i* which is one of the three-dimensional objects 733 is selected (step S110). For example, the ith proximal three-dimensional object 733*i* is the proximal three-dimensional object of the three-dimensional object 733 that is most proximal to the target position 180*t*. The ith proximal three-dimensional object 733*i* may not be the proximal three-dimensional object of the three-dimensional object 733 that is most proximal to the target position 180*t*.

Then, the (i+1)th proximal three-dimensional object 733 (i+1) of the three-dimensional object 733 that exists between the ith proximal three-dimensional object 733*i* and the proximal region 758*a* recited above is selected (step S120).

Continuing, the processing of i=i+1 is performed (step S102). Then, step S110 and step S120 recited above are repeated. For example, this ends when the distance between the (i+1)th proximal three-dimensional object 733 (i+1) and the proximal region 758*a* is smaller than a predetermined value (a threshold). By such processing, n proximal three-dimensional objects (n being an integer) are selected. These proximal three-dimensional objects are used as the three-dimensional object superimposing portion 734. The processing may be implemented by the information acquisition unit 410.

Thus, the information acquisition unit 410 selects one of the three-dimensional objects 733 (the ith proximal three-dimensional object 733*i*) (step S110) and further selects a three-dimensional object (the (i+1)th proximal three-dimensional object 733 (i+1)) that exists between the proximal region 758*a* recited above and the selected one three-dimensional object (the ith proximal three-dimensional object 733*i*) (step S120). Then, the three-dimensional object superimposing portion 734 includes the two selected three-dimensional objects (the ith proximal three-dimensional object 733*i* and the (i+1)th proximal three-dimensional object 733 (i+1)). Thus, the three-dimensional object superimposing portion 734 can be established.

For example, information relating to the three-dimensional object 733 is obtained based on, for example, the map information and the current position acquired by the position acquisition unit 411. Or, the information relating to the three-dimensional object 733 is obtained based on the information obtained by the imaging unit 412. Or, the information relating to the three-dimensional object 733 is obtained based on the information detected by the distance sensor 413. On the other hand, a predetermined threshold relating to the height of the three-dimensional object 733 from the ground surface 751 is established. The three-dimensional object 733 having a height within the prescribed range is detected using the information relating to the configuration and the position relating to the three-dimensional object 733 and the predetermined threshold relating to the height.

For example, the processing described in regard to FIG. 6A to FIG. 6D and FIG. 7 is performed for the three-dimensional object 733 that is detected. For example, the three-dimensional object 733 most proximal to the target position 180*t* is selected; and the three-dimensional object 733 is stored as the route information. Then, the most proximal three-dimensional object 733 is recursively detected and stored in order as the route information by performing a search inside a fan-like region extending toward the position of the display apparatus 10 from the three-dimensional object 733 that is selected. The recursive search ends when the three-dimensional objects 733 can no longer be detected inside the fan-like region. For example, a curve that smoothly connects the positions of the three-dimensional objects 733 that are selected in an order reverse to the order in which the three-dimensional objects 733 were obtained is made using a method such as a spline curve, etc., and is used as the route to display the display object 180.

The search of the three-dimensional object 733 may be implemented not in the fan-like region but in a region having another configuration. The three-dimensional objects 733 having short distances to a straight line connecting the target position 180*t* and the position of the display apparatus 10 may be selected. Thus, the three-dimensional objects 733 are selected along the route approaching the position of the display apparatus 10 from the target position 180*t*. Then, the selected three-dimensional objects are used as the three-dimensional object superimposing portion 734.

FIG. 8A to FIG. 8D are schematic views illustrating the operations of the display apparatuses.

FIG. 8A illustrates the image of the external environment 732. FIG. 8B illustrates the state in which the display object 180 that is displayed by the display apparatus 10 according to the embodiment is viewed superimposed onto the external environment 732. FIG. 8C illustrates the display state of the display apparatus 19a of the first reference example. FIG. 8D illustrates the display state of the display apparatus 19b of the second reference example.

In this example as shown in FIG. 8A, a left road 750l that extends to the left side is connected at the left side of the road 750. In this example, the display object instructs to make a left turn at a spot (the intersection 750s) where the road 750 intersects the left road 750l. In the external environment 732, the three-dimensional object 733 having a portion higher than the ground surface 751 exists at the side of the road 750 (in this example, the side on the right side). For example, the three-dimensional object 733 is the wall of a building, etc., provided along the right side of the road 750.

In the display apparatus 10 according to the embodiment as shown in FIG. 8B, the display object 180 is displayed along the three-dimensional object superimposing portion 734 of the three-dimensional object 733. The display object 180 is displayed along the three-dimensional object superimposing portion 734 at the side on the right of the road 750 to make a left turn at the position of the intersection 750s (the target position 180t). The display object may move to make a left turn at the position of the intersection 750s (the target position 180t) after moving along the three-dimensional object superimposing portion 734.

In the display apparatus 19a as shown in FIG. 8C, the display object 189a is displayed along the road 750; and the distance of the display object 189a inside the superimposed region 185 from the edge on the proximal region 758a side to the position of the intersection 750s is short. In the display apparatus 19b as shown in FIG. 8D, the display object 189b is displayed along the boundary of the road 750; and the length of the display object 189b is relatively short.

Conversely, in the embodiment as shown in FIG. 8B, the length of the display object 180 is longer than the length of the display object 189a and the length of the display object 189b. In the embodiment, the display object 180 is easily recognized; and the position (the target position 180t) of the external environment 732 indicated by the display object 180 is easy to perceive.

Thus, the three-dimensional object superimposing portion 734 on the side opposite to the direction indicated by the display object 180 may be used (e.g., FIG. 8B); and the three-dimensional object superimposing portion 734 on the same side may be used (e.g., FIG. 5B).

Figure 9A:
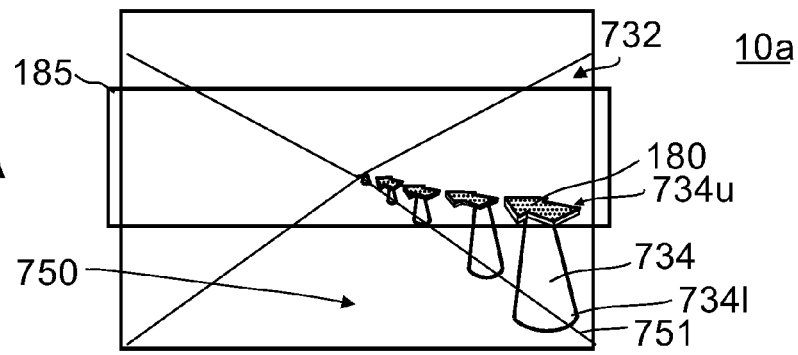
FIG. 9A to FIG. 9C are schematic views illustrating the operations of display apparatuses according to the first embodiment.
Figure 9B:
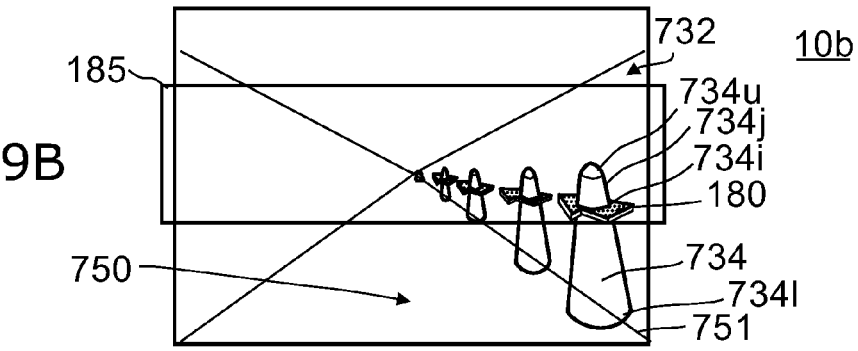
Figure 9C:
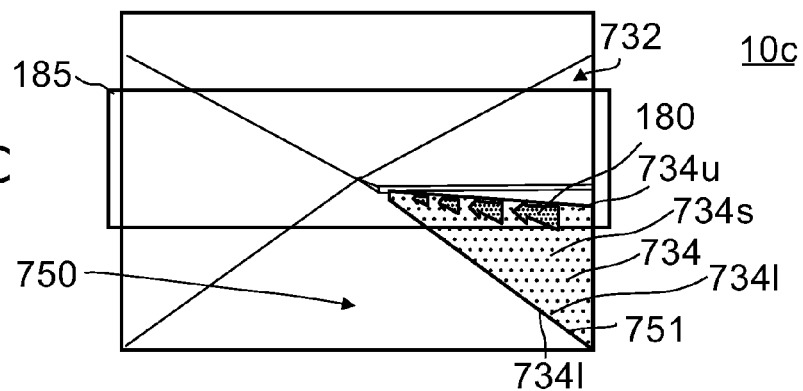

FIG. 9A to FIG. 9C are schematic views illustrating the operations of display apparatuses according to the first embodiment.

These drawings illustrate the display object and the three-dimensional object superimposing portion 734 according to the embodiment.

In this example as shown in FIG. 9A, a pole provided at the edge of the road 750 is used as the three-dimensional object superimposing portion 734. The three-dimensional object superimposing portion 734 has the apical portion 734u on the side opposite to the ground surface 751. In a display apparatus 10a according to the embodiment, the display object 180 is displayed along the apical portion 734u of the three-dimensional object superimposing portion 734. By displaying the display object 180 along the apical portion 734u of the three-dimensional object superimposing portion 734, the display object 180 is more easily recognized.

In this example as shown in FIG. 9B, the pole provided at the edge of the road 750 is used as the three-dimensional object superimposing portion 734. The three-dimensional object superimposing portion 734 has a bottom portion 734l on the ground surface 751 side, the apical portion 734u on the side opposite to the ground surface 751, and an intermediate portion 734i between the bottom portion 734l and the apical portion 734u. In a display apparatus 10b according to the embodiment, the display object 180 is displayed along the intermediate portion 734i of the three-dimensional object superimposing portion 734. In this example, the portion of the display object 180 that overlays a portion 734j of the three-dimensional object superimposing portion 734 that is higher than the intermediate portion 734i is not displayed. There are cases where the height of the three-dimensional object superimposing portion 734 is relatively high and viewing is difficult when the display object 180 is displayed along the apical portion 734u of the three-dimensional object superimposing portion 734. In such a case, the display object 180 is displayed along the intermediate portion 734i of the three-dimensional object superimposing portion 734. In such a case, the display object 180 can be perceived more naturally by not displaying the portion of the display object 180 that is hidden by the three-dimensional object superimposing portion 734 (the portion in the interior of the three-dimensional object superimposing portion 734 or the portion in the shadow of the three-dimensional object superimposing portion 734).

In this example as shown in FIG. 9C, a wall provided at the edge of the road 750 is used as the three-dimensional object superimposing portion 734. The three-dimensional object superimposing portion 734 has the bottom portion 734l on the ground surface 751 side, the apical portion 734u on the side opposite to the ground surface 751, and a side surface 734s between the bottom portion 734l and the apical portion 734u. For example, the side surface 734s is a surface of the wall. In a display apparatus 10c according to the embodiment, the display object 180 is displayed along the side surface 734s (the wall) of the three-dimensional object superimposing portion 734. In the case where the three-dimensional object superimposing portion 734 is a wall or the like, the display object 180 can be perceived more naturally when the display object 180 is displayed along the surface of the wall than when the display object 180 is displayed along the upper portion of the wall (corresponding to the apical portion 734u of the three-dimensional object superimposing portion 734).

The operations of the display apparatuses 10a to 10c recited above may be implemented in combination. For example, in the case where the pole and the wall are used as the three-dimensional object superimposing portion 734, the operations described in regard to the display apparatuses 10a and 10b are implemented in the region where the display object 180 is displayed along the pole portion; and, for example, the operation described in regard to the display apparatus 10c is implemented in the region where the display object 180 is displayed along the wall. Thereby, the display object 180 can be recognized more easily.

For example, in the data supply unit 130, the image data 130d of the image including the display object 180 described in regard to the display apparatuses 10a to 10c is generated. For example, the information relating to the route for displaying the display object 180 that is acquired by the position acquisition unit 411 is supplied to the data supply unit 130. The data supply unit 130 disposes the display object 180 in the image based on this route.

For example, the threshold relating to the height of the three-dimensional object superimposing portion 734 and the threshold relating to the diameter of the three-dimensional object superimposing portion 734 are predetermined. For example, the operation described in regard to the display apparatus 10a is performed in the case where the height of the three-dimensional object superimposing portion 734 is lower than the threshold relating to the height. For example, the operation described in regard to the display apparatus 10b is performed in the case where the height of the three-dimensional object superimposing portion 734 is higher than the threshold relating to the height and the diameter of the three-dimensional object superimposing portion 734 is less than the threshold relating to the diameter. For example, the operation described in regard to the display apparatus 10c is performed in the case where the height of the three-dimensional object superimposing portion 734 is higher than the threshold relating to the height and the diameter of the three-dimensional object superimposing portion 734 is thicker than the threshold relating to the diameter. Thus, the method for displaying the display object 180 may be modified according to the height and the diameter of the three-dimensional object superimposing portion 734. For example, in the case where the display method is modified, the change of the configuration of the display object 180 from the display object 180 superimposed onto one three-dimensional object superimposing portion 734 to the display object 180 superimposed onto one other three-dimensional object superimposing portion 734 may be performed by, for example, a linear approximation.

For example, the display apparatus according to the embodiment has an operation mode (a first mode) that displays the display object 180 along the three-dimensional object superimposing portion 734 when viewed via the projection layer 712. For example, the display apparatus according to the embodiment may further have an operation mode (a second mode) that displays the display object 180 along the road 750 when viewed via the projection layer 712. For example, the display object 180 may be displayed by the second mode in the case where an appropriate three-dimensional object superimposing portion 734 does not exist or in the case where the number of the three-dimensional object superimposing portions 734 is not more than a prescribed number. For example, switching between the first mode and the second mode may be implemented according to the number of the three-dimensional object superimposing portions 734.

For example, switching between the first mode and the second mode may be implemented according to the proportion of the surface area of the road 750 existing inside the superimposed region 185 and the surface area of the three-dimensional object 733 existing inside the superimposed region 185 in the external environment 732. For example, the first mode is implemented when, for example, the proportion of the surface area of the three-dimensional object 733 existing inside the superimposed region 185 to the surface area of the road 750 existing inside the superimposed region 185 is not less than a predetermined value. For example, the second mode is implemented when the proportion is less than the predetermined value. By such an operation, a display apparatus that is easier to use can be provided.

SECOND EMBODIMENT

Figure 10:
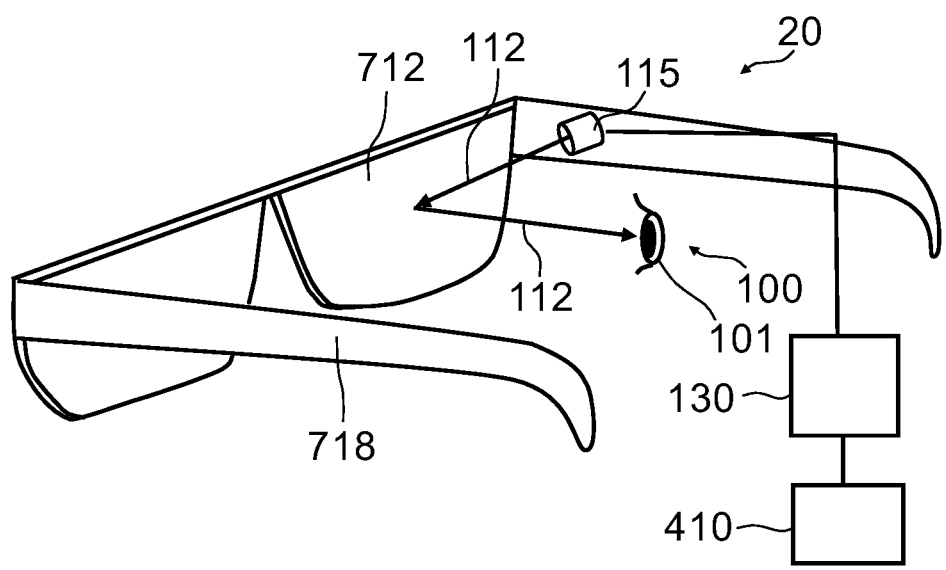
FIG. 10 is a schematic perspective view illustrating the configuration of a display apparatus according to a second embodiment.

FIG. 10 is a schematic perspective view illustrating the configuration of a display apparatus according to a second embodiment.

As shown in FIG. 10, the display apparatus 20 according to the embodiment further includes the projection layer 712 in addition to the image projection unit 115, the information acquisition unit 410, and the data supply unit 130. The projection layer 712 is disposed in front of the eye 101 of the human viewer 100. The display apparatus 20 further includes a holding unit 718 for mounting to the head 105 of the human viewer 100. The projection layer 712 is provided at the position of the lens of the glasses. For example, the holding unit 718 corresponds to the temple arm of the glasses. The projection layer 712 and the image projection unit 115 of the display apparatus 20 are mountable to the head of the human viewer 100.

For example, the display apparatus 20 can implement the operations described in regard to FIG. 1A to FIG. 1C, FIG. 5B, FIG. 6A to FIG. 6D, FIG. 7, FIG. 8B, and FIG. 9A to FIG. 9C. Thereby, the depthward position of the display object 180 can be perceived with good precision.

The display apparatus 20 may be mounted to the head 105 of the user (the human viewer 100) and may move with the movement of the user. For example, the information acquisition unit 410 may acquire the position of the display apparatus 20 by, for example, GPS via, for example, a portable terminal (a mobile telephone, etc.). Further, the information relating to the three-dimensional object 733 and the three-dimensional object superimposing portion 734 may be acquired via the portable terminal.

According to the embodiment, a display apparatus that can cause the depthward position of the display object to be perceived with good precision is provided.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in display apparatuses such as image projection units, image formation units, projection units, data supply units, information acquisition units, position acquisition units, imaging units, distance sensors, etc., from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all display apparatuses practicable by an appropriate design modification by one skilled in the art based on the display apparatuses described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display apparatus, comprising:
an image projection unit to project a light flux including an image toward a first side of a projection layer, the projection layer being reflective and transmissive;
an information acquisition unit to acquire information relating to a position of a three-dimensional object superimposing portion included in a three-dimensional object positioned along a side of a road on a second side of the projection layer opposite the first side, the road extending from a proximal region of the second side of the projection layer toward a distal region of the second side of the projection layer, the three-dimensional object superimposing portion being higher than a ground surface and viewable via the projection layer; and a data supply unit to supply data relating to the image including a display object to the image projection unit based on the information relating to the position of the three-dimensional object superimposing portion acquired by the information acquisition unit, the display object being displayed along the three-dimensional object superimposing portion when viewed via the projection layer.

2. The apparatus according to claim 1, wherein
the display object indicates a position of a target of an external environment on the second side of the projection layer, and
the display object indicates a route from the proximal region to the position of the target.

3. The apparatus according to claim 2, wherein the information acquisition unit selects a first proximal three-dimensional object included in the three-dimensional object, and the three-dimensional object superimposing portion includes the first proximal three-dimensional object, a distance from the first proximal three-dimensional object to the position of the target being shorter than a predetermined distance.

4. The apparatus according to claim 2, wherein multiple three-dimensional objects are included in the three-dimensional object and the information acquisition unit selects one of the multiple three-dimensional objects and further selects one other of the multiple three-dimensional objects existing between the proximal region and the selected one of the multiple three-dimensional objects, and the three-dimensional object superimposing portion includes the two selected ones of the multiple three-dimensional objects.

5. The apparatus according to claim 2, wherein
the three-dimensional object superimposing portion has a portion proximal to a position of the proximal region, and a portion proximal to the position of the target,
the display object includes multiple display objects, and
the multiple display objects are arranged along the three-dimensional object superimposing portion from a portion proximal to the position of the proximal region and to a portion proximal to the position of the target when viewed via the projection layer.

6. The apparatus according to claim 2, wherein
the three-dimensional object superimposing portion has a portion proximal to a position of the proximal region, and a portion proximal to the position of the target, and
the display object is continuous between the portion of the three-dimensional object superimposing portion proximal to the position of the proximal region and the portion of the three-dimensional object superimposing portion proximal to the position of the target when viewed via the projection layer.

7. The apparatus according to claim 2, wherein the position of the target corresponds to a position of an intersection of the road.

8. The apparatus according to claim 3, wherein the information acquisition unit selects a second proximal three-dimensional object included in the three-dimensional object, and the three-dimensional object superimposing portion includes the second proximal three-dimensional object, the second proximal three-dimensional object existing between the first proximal three-dimensional object and the proximal region.

9. The apparatus according to claim 1, wherein
the three-dimensional object superimposing portion has an apical portion on a side opposite to the ground surface, and
the display object is displayed along the apical portion of the three-dimensional object superimposing portion.

10. The apparatus according to claim 1, wherein
the three-dimensional object superimposing portion has a bottom portion on a side of the ground surface, an apical portion on a side opposite to the ground surface, and a side surface between the bottom portion and the apical portion, and
the display object is displayed along the side surface of the three-dimensional object superimposing portion.

11. The apparatus according to claim 1, wherein
the three-dimensional object superimposing portion has a bottom portion on a side of the ground surface, an apical portion on a side opposite to the ground surface, and an intermediate portion between the bottom portion and the apical portion,
the display object is displayed along the intermediate portion of the three-dimensional object superimposing portion, and
a portion of the display object overlaying a portion of the three-dimensional object superimposing portion higher than the intermediate portion is not displayed.

12. The apparatus according to claim 1, further comprising the projection layer.

13. The apparatus according to claim 1, wherein
the display apparatus is mounted in a moving body including a windshield provided between the external environment and a human viewer that views the display object,
the projection layer is provided proximally to the windshield, and
the image projection unit causes the light flux to be incident on one eye of the human viewer and causes the light flux to be not incident on both eyes of the human viewer.

14. The apparatus according to claim 1, wherein a width of a projection area of the light flux in a lateral direction when viewed by a human viewer is controlled to be not more than 70 mm at a position of the human viewer that views the display object.

15. The apparatus according to claim 1, wherein the image projection unit causes a human viewer to view the display object and an image of the external environment simultaneously.

16. The apparatus according to claim 1, wherein the information acquisition unit acquires the information relating to the three-dimensional object superimposing portion based on information relating to a position of the display apparatus acquired by a position acquisition unit configured to acquire the information relating to the position of the display apparatus.

17. The apparatus according to claim 1, further comprising:
a position acquisition unit configured to acquire information relating to a position of the display apparatus,
the information acquisition unit acquiring the information relating to the three-dimensional object superimposing portion based on the information relating to the position of the display apparatus acquired by the position acquisition unit.

18. The apparatus according to claim 1, further comprising:
an imaging unit configured to image an image of the external environment, the information acquisition unit acquiring the information relating to the three-dimensional object superimposing portion based on the image of the external environment imaged by the imaging unit.

19. The apparatus according to claim 1, wherein the three-dimensional object includes at least one of a building, a street light, guardrail, a pole and a column provided at the side of the road.

20. The apparatus according to claim 1, wherein a distance between the three-dimensional object superimposing portion and the ground surface is not less than 0.3 m and not more than 10 m.

* * * * *